United States Patent
Leithner

[11] Patent Number: 5,517,818
[45] Date of Patent: May 21, 1996

[54] GAS GENERATION APPARATUS

[75] Inventor: Reinhard F. Leithner, Braunschweig, Germany

[73] Assignee: EVT Energie und Verfahrenstechnick GmbH, Stuttgart, Germany

[21] Appl. No.: 475,851

[22] Filed: Jun. 7, 1995

Related U.S. Application Data

[60] Division of Ser. No. 275976, Jul. 15, 1994, which is a continuation-in-part of Ser. No. 142165, Oct. 22, 1993, abandoned.

[30] Foreign Application Priority Data

Oct. 22, 1992 [DE] Germany .......................... 42 35 598.2
Oct. 15, 1993 [DE] Germany .......................... 43 35 136.0

[51] Int. Cl.⁶ .................................................. F02C 3/26
[52] U.S. Cl. ...................... 60/39.464; 110/204; 110/216
[58] Field of Search ............................... 48/62 R, 63, 64, 48/67, 76, 77, 128; 60/39.12, 39.182, 39.02, 39.05, 39.464; 110/216, 342, 345, 347, 204, 264

[56] References Cited

U.S. PATENT DOCUMENTS

| | | | |
|---|---|---|---|
| 4,380,154 | 4/1983 | Eastman | 60/39.464 |
| 4,462,206 | 7/1984 | Aguet | 60/39.464 |
| 4,472,936 | 9/1984 | Uchiyama et al. | 60/39.464 |
| 5,024,170 | 6/1991 | Santanam et al. | 60/39.464 |
| 5,165,236 | 11/1992 | Nieminen | 60/39.464 |

Primary Examiner—Peter Kratz

[57] ABSTRACT

Hot, cleansed driver fluid for a gas turbine is produced by the burning of pulverized coal, cooling of the exhaust gases resulting from burning, purifying the cooled exhaust gases and then reheating the purified gas to the appropriate level for supply to the gas turbine. The reheating of the purified gas is accomplished through heat exchange with the impure gas during the cooling step and through heat exchange with the combustion chamber in which the burning of the coal occurs.

14 Claims, 2 Drawing Sheets 5,517,818

GAS GENERATION APPARATUS

CROSS-REFERENCE TO RELATED APPLICATION

This application is a division of application Ser. No. 275,976 filed Jul. 15, 1994. Application Ser. No. 275,976 was a continuation-in-part of application Ser. No. 08/142,165 filed on Oct. 22, 1993, and now abandoned.

BACKGROUND OF THE INVENTION

1. Field of the Invention

The present invention relates generally to the production of driver fluid for a gas turbine and particularly to a gas generator for a stationary gas turbine which cooperates with a waste heat steam generator. More specifically, this invention is directed to a method of and apparatus for operating a gas turbine in a combined gas and steam generation facility and especially to the production of hot, pure gas turbine driver gases from coal. Accordingly, the general objects of the present invention are to provide novel and improved methods and apparatus of such character.

2. Description of the Prior Art

In the interest of the use of readily available coal as a fuel, while at the same time minimizing the potential for environmental damage, it has been proposed that pulverized coal be burned and the hot exhaust gases resulting from the combustion be employed as the driver gas for a turbine in a combined gas and steam turbine generating facility. In such a facility, fine-grained coal or coal dust is mixed with a source of oxygen, i.e., air, air enriched with oxygen or pure oxygen, and burned at a pressure in excess of one bar and at a temperature in excess of 1,000° C. The combustion process may be enhanced by recirculation of the exhaust gases through the combustion chamber, such recirculation ensuring the appropriate combustion temperature. The combustion process produces an exhaust gas that basically comprises $CO_2$ and steam. When air is delivered to the combustion chamber, the exhaust gas may also comprise nitrogen. Prior to use of a hot exhaust gas produced through the burning of pulverized coal to drive a turbine, the gas must be cleaned of errosive particulate matter and corrosive material such as alkali metal compounds. Additionally, it is necessary to remove $SO_2$ and $NO_x$ from the gases resulting from the combustion process. Once purified, the hot exhaust gases may be caused to serially flow through a gas turbine and a waste heat steam generator. In the waste heat steam generator, heat will be exchanged from the exhaust gases to water which is preheated, evaporated and superheated to operate a steam turbine on one or more levels of pressure.

An example of a coal fueled gas and steam generating facility employing a gas turbine may be seen in VGB Kraftwerkstechnik published in 1990, volume 5, pages 399–405. It is essential that the gas resulting from the combustion process in such a facility be purified prior to delivery to the gas turbine, i.e., gases produced through the combustion of coal contain matter and substances, as discussed above, that would damage a gas turbine. The need for purification, however, presents a substantial problem because efficient operation of a modern gas turbine requires that the inlet temperature exceed 1,200° C. However, known and effective gas purification technology requires that the temperature of the gases to be cleansed of pollutants be lowered to a level in the range of 650°–950° C. This relatively low temperature is particularly critical for the dry additive process, i.e., the desulfurization by lime dust injection, and the selective non-catalytic reduction process (SNCR), i.e., reduction of nitrous oxide with ammonia without a catalyst. In the prior art, in order to lower the temperature of the exhaust gases resulting from the combustion of pulverized coal to the 650°–950° C. range, the exhaust gases were passed through a water-steam heat exchanger and/or air was injected. The temperature reduction results in diminished plant efficiency, as mentioned above, due to the lowering of the gas turbine inlet temperature.

The desire to minimize the possibility of environmental damage, and governmental regulations which seek to achieve this objective, demand that machinery such as gas turbines be operated with maximum efficiency. Obviously, the more efficiently the facility operates, the less fuel which must be burned to achieve a given output.

SUMMARY OF THE INVENTION

The present invention overcomes the above-briefly discussed and other deficiencies and disadvantages of the prior art and, in so doing, provides a novel and improved process for producing, from the combustion of coal, gas having a sufficiently high temperature and degree of purity to be suitable for driving a gas turbine. The present invention also encompasses apparatus for implementing this novel process wherein gases produced through the combustion of coal are cleansed, by known and proven techniques, and the pure gases thus produced are delivered to the inlet of a gas turbine at a temperature in the range of 1,200°–1,400° C. In accordance with the invention, heat is exchanged between the unpurified, i.e., crude, gases resulting from the combustion process and the purified gas whereby overall process heat losses are reduced when compared to the prior art and the efficiency of the process is enhanced. A facility in accordance with the present invention has the advantage that the gas turbine may be operated with its own exhaust gas discharge stack independently of an associated waste heat boiler.

In accordance with a preferred embodiment of the invention, the pressure vessel in which combustion occurs and at least one connecting conduit of the gas purification system are employed as a heat exchanger, and the external temperature of the pressure vessel and connecting conduit walls are reduced with the same insulation strength.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the two figures and in which.

DETAILED DESCRIPTION OF THE DISCLOSED EMBODIMENT

Figure 1:
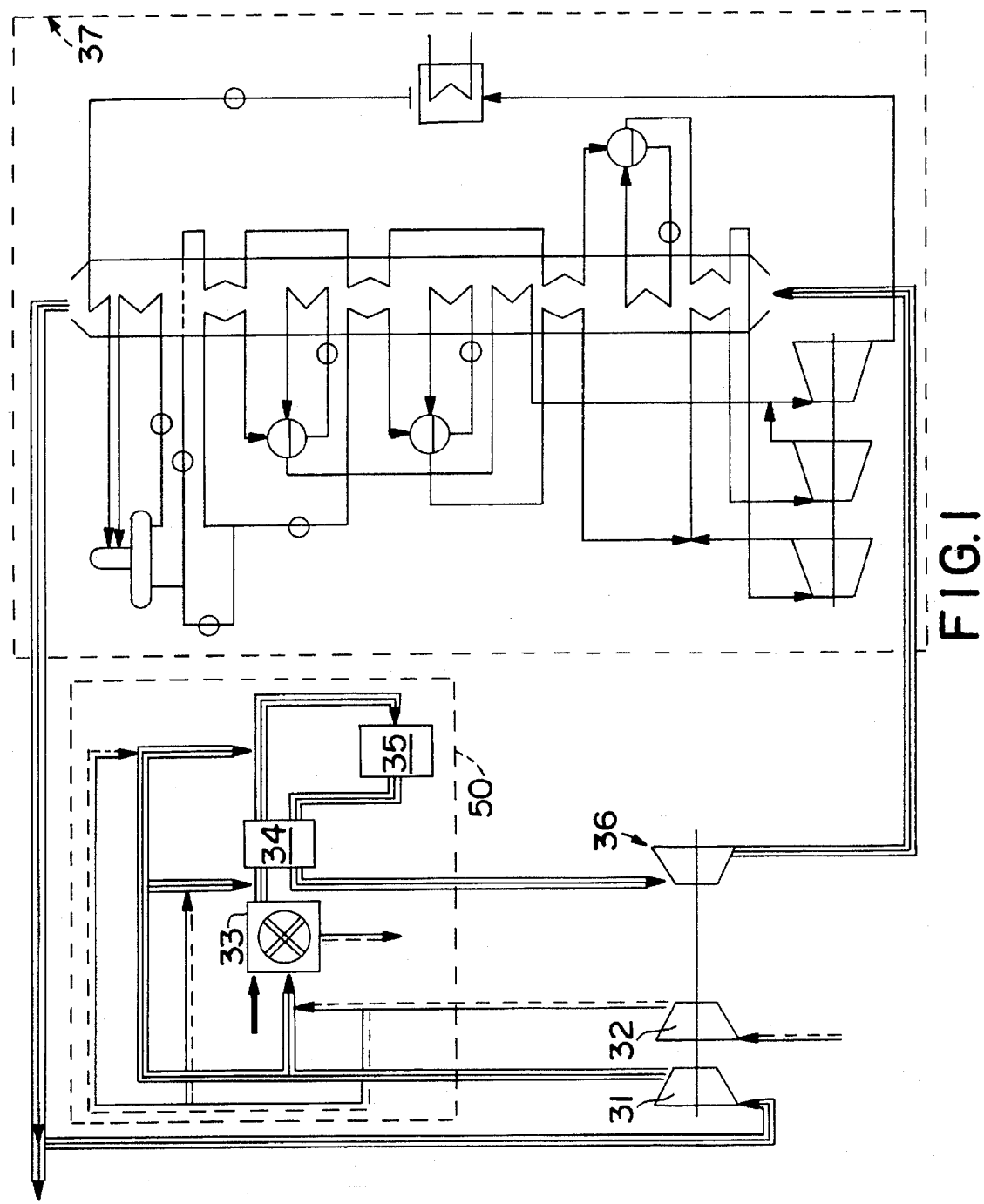
FIG. 1 is a schematic view of a combined gas turbine and steam turbine facility, such as may be used by an electrical utility for the generation of electricity, which employs the present invention.

FIG. 1 generally shows, in the form of a schematic diagram, a combined gas turbine and steam turbine facility. The steam turbine facility comprises a waste-heat steam generator and includes turbine stages and steam generators. The waste-heat steam generator has been depicted schematically using conventional symbols and has been indicated generally at 37. Waste-heat steam generator 37 does not form part of the present invention and thus will not be further described herein.

The gas turbine portion of the facility of FIG. 1 includes a gas turbine per se, indicated generally at 36, and a driver gas producer, which has been indicated generally at 50. The gas turbine subsystem also includes an exhaust gas compressor 31, which receives a portion of the exhaust gases from the waste heat steam generator 37, and a compressor 32 for the gas which supplies the oxygen for supporting combustion of the fossil fuel. This gas may be air, air enriched with oxygen or pure oxygen. The compressed gas for supporting combustion is delivered from compressor 32 to an oxidizer 33 where the combustion process occurs. Compressors 31 and 32 are driven by turbine 36. As will be described in greater detail below in the discussion of FIG. 2, the driver gas producer 50 includes a gas purification stage, indicated generally at 35, and also includes a heat exchanger stage, indicated generally at 34, positioned intermediate oxidizer 33 and gas purifier 35. The gases resulting from the combustion process are delivered to gas turbine 36 from the purifier 35 via the heat exchanger 34.

Figure 2:
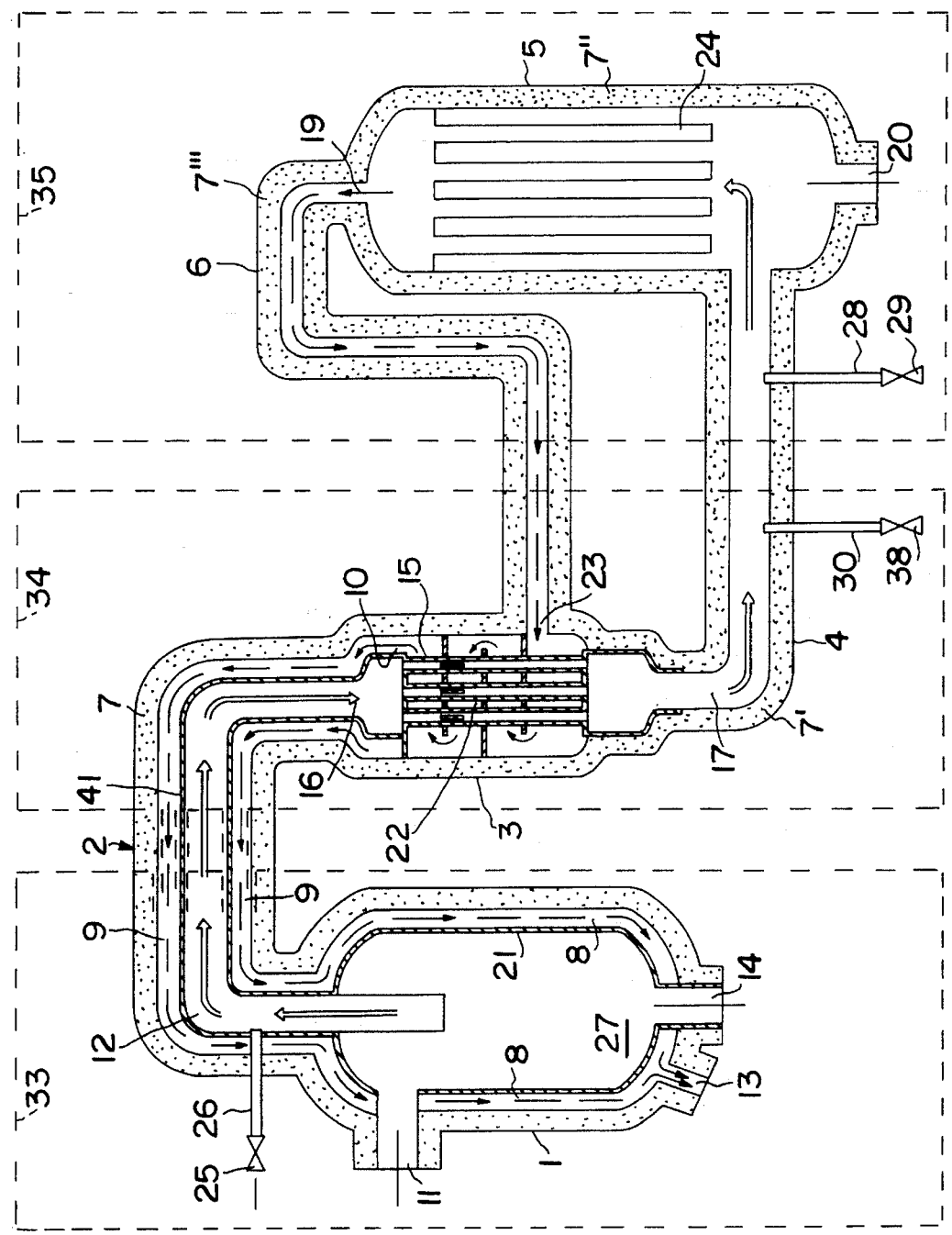
FIG. 2 is a cross-sectional, schematic, side-elevational view of a first embodiment of a gas turbine driver gas generating apparatus in accordance with the invention.

With reference now to FIG. 2, the oxidizer stage 33, heat exchanger stage 34 and gas purification stage 35 of the driver gas producer 50 of FIG. 1 are shown in detail. The oxidizer stage 33 is defined by a pressure vessel 1 which forms a combustion chamber 27. The pulverized fossil fuel, i.e., fine-grained coal or coal dust, entrained in a carrier gas at a pressure of, for example, 15 bar is delivered to combustion chamber 27 via a fuel supply inlet 11. The combustible fuel stream delivered to combustion chamber 27 via inlet 11 also includes, in the disclosed embodiment, the pressurized oxygen source gas provided by compressor 32. The fuel stream may further include recirculated exhaust gas, i.e., gas discharged from the waste heat steam generator 37, supplied via compressor 31. Combustion chamber 27 is preferably a cyclone-like burner. Combustion will occur in chamber 27, by means known in the art and therefore not shown, either at a temperature at which the ashes remain solid or, alternatively, the non-gaseous waste products can be drawn off in molten form. The combustion temperature may be adjusted by exercising control over the quantity of the gases delivered to the combustion chamber from compressors 31 and 32 to produce an impure exhaust gas at a temperature in excess of 1000° C. The non-gaseous waste products from the combustion process may be removed from combustion chamber 27 via an ash outlet 14. If the combustion temperature in chamber 27 is above the melting point of the ashes, the exhaust gases are cooled at the gas outlet 12 of combustion chamber 27 by mixing with recirculated waste gas or by mixing with the gas from compressor 32 which supplies the oxygen for supporting combustion, the cooling gas in either case being ejected via a quench gas feed 26 under the control of a valve 25. This cooling may be necessary to avoid "slagging" downstream of combustion chamber 27. For reasons which will become obvious from the discussion below, the pressure vessel 1 includes an inner heat-conducting liner 21 which, in part, defines a duct 8. The gas flowing through duct 8 is discharged via a purified gas outlet 13 and delivered to gas turbine 36 as the driver gas therefor.

The crude combustion gases which exit combustion chamber 27 via outlet 12 are delivered, through a connecting conduit 2, to heat exchanger 34 in the disclosed embodiment of the invention. As will be described in greater detail below, the conduit 2 itself functions as a heat exchanger. Thus, connecting conduit 2 includes, surrounding the flow path for the hot gases leaving combustion chamber 27, a duct 9. The inner wall 41 of duct 9 is an extension of liner 21 of the combustion chamber 27. The coaxial, outer wall 7 of duct 9 is an extension of the thermal insulating outer wall of combustion chamber 27.

The heat exchanger stage 34 has an inlet 16 for the hot, crude combustion gases. In the manner known in the art, the heat exchanger stage 34 comprises a pressure vessel defined by a thermally insulated outer wall 3 which is an extension of the insulated outer wall 7 of conduit 2. In FIG. 2, the heat exchanger is shown schematically as having an internal labyrinth 15 which defines plural, generally counter-flowing gas passages with heat exchange surfaces arranged therebetween. The "pure" gas which exits the gas purification stage 35 is delivered to heat exchanger stage 34 via an inlet 23, the heat exchanger structure preventing any mixing of the gases delivered thereto via inlets 16 and 23. The flow path for the purified gas in heat exchanger stage 34 includes an outer duct 10.

The cooled, crude combustion gases leave the pressure vessel of the heat exhanger stage 34 via an outlet 17 and are delivered, via a conduit 4 at a temperature less than 1000° C., to the purification stage 35. Conduit 4 defines a single flow path, i.e., does not function as a heat exchanger, and has an outer layer of thermal insulation 7' which is a continuation of the insulated outer wall 3 of the heat exchanger pressure vessel. The gas exiting the heat exchanger 34 is further cooled by mixing with a gas delivered into conduit 4 via conduit 30 under the control of valve 38. The gas delivered into conduit 4 via conduit 30 may be recirculated exhaust gas from the waste-heat steam generator 37 and/or the gas provided by compressor 32 both the temperature in the gas purification stage 35 and the temperature difference (and therefore also the size) in the heat exchanger stage 34.

The cooled, crude gases resulting from combustion are delivered to the purification stage 35 at a temperature which permits contaminants to be removed by known methods. Such known methods include cyclone separators, fibrous filters, ceramic filter tubes (such as indicated at 24) and other techniques which will remove dust including alkali metal compounds. The gases delivered to the purification stage 35 may also be desulferated by known methods such as, for example, the dry additive technique wherein lime dust is injected. Likewise, nitrous oxides may be removed from the crude gas by the selective non-catalytic reduction method, i.e., by ammonia injection. The requisite additives are injected into the crude gas stream in the conduit 4 via a conduit 28 under control of a valve 29. The gas purification processes take place in a pressure vessel 5 and any solid residues resulting from the processes occurring in pressure vessel 5 will fall to the bottom of the vessel and can be removed via outlet 20. Pressure vessel 5 is provided with inner insulation 7", which is an extension of the insulated wall 7' of conduit 4. Pressure vessel 5 also has a pure gas outlet 19 via which the pure gas is delivered to a conduit 6. Conduit 6 has an inner insulation 7'''.

The pure gas exiting purification stage 35 is delivered, via conduit 6, back to the inlet 23 of the heat exchanger in the heat exchange stage 34 of the disclosed embodiment. Heat is added to the pure gas in the heat exchanger and the heated pure gas is then delivered, via the outer of the coaxial passages defined by conduit 2, i.e., duct 9, back to the combustion stage 33. During passage through duct 9, the pure gas is further heated by heat exchange with the crude combustion gas. In combustion stage 33, the pure gas is additionally heated by being directed through duct 8 wherein heat is transferred to the gas from the combustion chamber 27 via liner 21. The pure gas is then discharged, at a temperature of at least 1,200° C., from duct 8 via outlet 13 and delivered to the gas turbine 36.

After functioning as the driver gas for turbine 36, the purified gas is delivered, as indicated in FIG. 1, to the waste heat steam generator 37 in which water is preheated, evaporated and superheated to operate a steam turbine at one or more pressure levels. As depicted schematically in FIG. 1, the steam generator stage 37 has three different pressure levels. Heat for supplemental purposes may be recovered at the waste-heat steam generator stage 37.

As discussed above, after passing through the waste-heat boiler of steam generator stage 37, some of the exhaust gas may be recirculated to the combustion/purification stage 50 via compressor 31 which is driven by gas turbine 36. Any exhaust gas which is not recirculated can be further cleaned, by means known in the art, and then discharged from the power plant via an exhaust stack. If the gas delivered to the combustion stage 33 via compressor 32 is pure oxygen, the final waste gases which are produced by a power plant as depicted in FIG. 1 consist almost entirely of $CO_2$ and water vapor. Further cooling of such a waste gas stream results in condensation of the water vapor and liquification and subsequent freezing to ice of the $CO_2$. If the nitrogen separated from the ambient air in order to produce the oxygen feed stream is ignored, the power plant is effectively free of exhaust gas.

The combustion chamber pressure vessel 1, the coaxial flow conduit 2 and the pressure vessel of the heat exchanger stage 34 are, as may be seen from FIG. 2, designed so that the pressure absorbing wall is on the outside with an inner insulation, i.e., the pure gas flowing through the ducts 8, 9 and 10, is separated from the crude gas by only a heat-conducting, dust-impermeable, incombustible lining as indicated at 21 and 41. This arrangement is possible because there is no significant pressure differential across the linings and the arrangement permits high heat transfer efficiency to be achieved.

While a preferred embodiment has been shown and described, various modifications and substitutions may be made thereto without departing from the spirit and scope of the invention. For example, in at least some installations, the heat exchanger structure of heat exchange stage 34 may be eliminated and the pure gas reheated solely by means of flow through the ducts 8 and 9. Accordingly, it is to be understood that the present invention has been described by way of illustration and not limitation.

What is claimed is:

1. Apparatus for generating hot pure gas turbine driver gas through combustion of a fossil fuel in particulate form, said-driver gas generating apparatus comprising:

oxidizer means, said oxidizer means comprising a pressure vessel which defines a combustion chamber, said combustion chamber having a lining which defines a duct for the flow of purified gas, said lining having a high thermal conductivity whereby said duct is in a heat transfer relationship with said combustion chamber, said duct having an inlet and an outlet, said oxidizer means further having a fuel supply inlet for said combustion chamber, an impure exhaust gas outlet and an outlet for non-gaseous waste products;

means for delivering a mixture of combustible fossil fuel in particulate form and a gas which supports combustion to said combustion chamber fuel supply inlet, the fuel being burned in said combustion chamber to produce an impure exhaust gas at a temperature in excess of 1,000° C.;

gas purification means, said purification means removing pollutants from said impure exhaust gas at a temperature which is less than 1,000° C. said purification means having an impure gas inlet and a pure gas outlet;

means for delivering said impure exhaust gas from said combustion chamber to said purification means, said delivering means including means for reducing the temperature of said impure exhaust gas to a level below 1,000° C. said delivering means at least in part defining a pair of coaxial gas flow paths, a first of said flow paths being coupled to said combustion chamber exhaust gas outlet at a first end and being coupled to said purification means gas inlet at its second end, the first end of the second of said flow paths being coupled to the inlet of said oxidizer means duct, said flow paths being in a heat exchange relationship;

conduit means for coupling said purification means pure gas outlet to the second of said delivering means coaxial flow paths at a point upstream of said first end thereof in the direction of pure gas flow therethrough; and means for connecting the outlet of said oxidizer means duct to the driver gas inlet of a gas turbine.

2. The apparatus of claim 1 wherein said oxidizer means combustion chamber is a cyclone combuster.

3. The apparatus of claim 1 wherein said means for delivering impure exhaust gas to said purification means includes a liner which comprises an extension of said oxidizer means lining, said liner at least in part defining said coaxial flow paths, whereby said delivering means defined coaxial gas flow paths are in a heat transfer relationship.

4. The apparatus of claim 1 wherein said means for delivering impure exhaust gas to said purification means further includes:

a heat exchanger, said heat exchanger being connected in series with said first and second flow paths, said conduit means delivering gas from said purification means to said heat exchanger means wherein said pure gas flows through said heat exchanger means to said second of said coaxial flow paths and said impure exhaust gas is delivered to said heat exchanger via said first of said coaxial flow paths so as to flow generally in opposition to the direction of flow of said pure gas.

5. The apparatus of claim 3 wherein said means for delivering impure exhaust gas to said purification means further includes:

a heat exchanger, said heat exchanger being connected in series with said first and second flow paths, said conduit means delivering gas from said purification means to said heat exchanger means wherein said pure gas flows through said heat exchanger means to said second of said coaxial flow paths and said impure exhaust gas is delivered to said heat exchanger via said first of said coaxial flow paths so as to flow generally in opposition to the direction of flow of said pure gas.

6. The apparatus of claim 3 wherein said oxidizer means combustion chamber is a cyclone combuster.

7. The apparatus of claim 4 wherein said oxidizer means combustion chamber is a cyclone combuster.

8. The apparatus of claim 5 wherein said oxidizer means combustion chamber is a cyclone combuster.

9. The apparatus of claim 1 wherein said gas purification means comprises:

a second pressure vessel; and filter means disposed in said second pressure vessel, the impure exhaust gas delivered to said purification means via said means for delivering passing through said filter means.

10. The apparatus of claim 9 wherein said filter means comprises a fibrous filter.

11. The apparatus of claim 9 wherein said filter means comprises a ceramic filter.

12. The apparatus of claim 9 wherein said gas purification means additionally comprises:

means for injecting additives into the stream of impure exhaust gas supplied via said means for delivering, said injecting means being positioned upstream of said second pressure vessel.

13. The apparatus of claim 5 wherein said gas purification means comprises:

a second pressure vessel; and filter means disposed in said second pressure vessel, the impure exhaust gas delivered to said purification means via said means for delivering passing through said filter means.

14. The apparatus of claim 13 wherein said gas purification means additionally comprises:

means for injecting additives into the stream of impure exhaust gas supplied via said means for delivering, said injecting means being positioned upstream of said second pressure vessel.

* * * * *